(12) United States Patent
Engel (10) Patent No.: US 11,911,864 B2
(45) Date of Patent: Feb. 27, 2024

(54) MACHINE TOOL FOR PROCESSING A WORKPIECE AND METHOD FOR PROCESSING THE WORKPIECE

(71) Applicant: DECKEL MAHO Seebach GmbH, Seebach (DE)

(72) Inventor: Andre Engel, Brotterode-Trusetal (DE)

(73) Assignee: DECKEL MAHO Seebach GmbH, Seebach (DE)

( * ) Notice: Subject to any disclaimer, the term of this patent is extended or adjusted under 35 U.S.C. 154(b) by 504 days.

(21) Appl. No.: 17/295,033

(22) PCT Filed: Nov. 19, 2019

(86) PCT No.: PCT/EP2019/081788
§ 371 (c)(1),
(2) Date: May 18, 2021

(87) PCT Pub. No.: WO2020/114765
PCT Pub. Date: Jun. 11, 2020

(65) Prior Publication Data
US 2022/0009046 A1  Jan. 13, 2022

(30) Foreign Application Priority Data
Dec. 3, 2018  (DE) .................. 10 2018 220 866.2

(51) Int. Cl.
*B23Q 3/157* (2006.01)
*B23Q 3/155* (2006.01)
*B23Q 11/08* (2006.01)

(52) U.S. Cl.
CPC ...... *B23Q 3/15503* (2016.11); *B23Q 3/15713* (2013.01); *B23Q 11/0891* (2013.01);
(Continued)

(58) Field of Classification Search
CPC ......... Y10T 483/115; Y10T 409/30392; B23Q 3/155–3/15793; B23Q 11/08–11/0891; B24B 55/04–55/057
(Continued)

(56) References Cited

U.S. PATENT DOCUMENTS

2006/0133903 A1\* 6/2006 Shiraishi ................ B23Q 11/08
409/134
2010/0173762 A1\* 7/2010 Tullmann ........... B23Q 3/15766
74/820
(Continued)

FOREIGN PATENT DOCUMENTS

CN  105026102 A  11/2015
CN  108237432 A   7/2018
(Continued)

OTHER PUBLICATIONS

International Search Report dated Apr. 15, 2020 for PCT App. Ser. No. PCT/EP2019/081788.
(Continued)

*Primary Examiner* — Erica E Cadugan
(74) *Attorney, Agent, or Firm* — Henricks Slavin LLP (57) ABSTRACT

The invention relates to a machine tool (100) for machining a workpiece, said machine tool (100) comprising a machine table (10) for clamping the workpiece, a work spindle (20)
(Continued)

for receiving a tool for machining the workpiece, a work space (70) substantially defined by the machine table (10) and at least one first cover (30), and a tool changer (50) arranged outside the work space (70) and configured to change the tool received in the work spindle (20), wherein the machine tool (100) is further configured such that, during a tool change, the first cover (30) is moved, as a result of which the work space (70) of the machine tool (100) is expanded by a tool changing area (80) and an access surface (42), through which the tool changer (50) can be moved into the tool changing area (80), is exposed, and the work spindle (20) is positioned in the tool changing area (80) such that the tool changer (50) is able to change the tool received by the work spindle (20) within the tool changing area (80).

20 Claims, 7 Drawing Sheets

(52) U.S. Cl.
CPC ............ *B23Q 2003/155418* (2016.11); *B23Q 2003/155446* (2016.11); *B23Q 3/15766* (2013.01); *Y10T 483/115* (2015.01); *Y10T 483/1771* (2015.01); *Y10T 483/1783* (2015.01)

(58) Field of Classification Search
USPC ..................... 483/3; 409/134; 451/451–457
See application file for complete search history.

(56) References Cited

U.S. PATENT DOCUMENTS

| | | | |
|---|---|---|---|
| 2017/0106484 A1* | 4/2017 | Toyooka | B23Q 11/0875 |
| 2018/0222002 A1* | 8/2018 | Kasahara | B23Q 11/08 |
| 2020/0262015 A1* | 8/2020 | Takada | B23Q 11/0891 |

FOREIGN PATENT DOCUMENTS

| | | | |
|---|---|---|---|
| CN | 113523896 A | * | 10/2021 |
| DE | 10101038 A1 | * | 7/2002 |
| EP | 2965862 A1 | | 1/2016 |
| JP | 59-088235 A | * | 5/1984 |
| JP | 2004-306185 A | * | 11/2004 |
| JP | 2006-095627 A | | 4/2006 |
| JP | 2008-105173 A | | 5/2008 |
| JP | 2013-063488 A | | 4/2013 |
| JP | 2015-009306 A | | 1/2015 |
| JP | 2017-074654 A | | 4/2017 |
| WO | WO-2015-059993 A | * | 4/2015 |
| WO | WO 2017/017825 A1 | | 2/2017 |
| WO | WO 2018/047301 A1 | | 3/2018 |

OTHER PUBLICATIONS

Office Action dated May 19, 2023 for corresponding Japanese App. Ser. No. 2021-531531, with English translation.
Office Action dated Sep. 25, 2023 for corresponding Chinese App. Ser. No. 201980080349.1, with English summary.

* cited by examiner

Prior Art

MACHINE TOOL FOR PROCESSING A WORKPIECE AND METHOD FOR PROCESSING THE WORKPIECE

The present invention relates to a machine tool for machining a workpiece. The present invention also relates to a method for machining the workpiece on the machine tool.

BACKGROUND OF THE INVENTION

Nowadays, travelling column machines are state of the art when it comes to machining large-volume and/or very heavy workpieces. The machines may have a tool changing device located behind a cover to be opened and holding tools for machining the workpiece. If the tool is to be changed, the cover opens and the tool changing device can be moved to the work spindle in order to carry out the tool change there.

In the known machine tools, it is often the case that the work spindle substantially remains in the work space of the machine tool during the tool change. Here, however, there is a great risk that the tool changing device collides with the workpiece clamped on the workpiece table during the movement to the work spindle and/or during the tool change itself, and this may damage the tool changing device and/or the workpiece.

Furthermore, the known machine tools are often configured such that such a tool change has to be performed at a specified position within the machine tool, namely usually in the vicinity of a tool magazine fixed on the machine tool. This means that the work spindle has to be moved to the specified position for each tool change operation, resulting in an increase in the processing time for the respective workpiece.

SUMMARY OF THE INVENTION

It is therefore an object of the present invention to provide a machine tool for machining a workpiece which allows avoiding the above-mentioned problems.

A further object of the present invention is to provide a method for machining the workpiece on the machine tool.

The objects are achieved by a machine tool according to claim 1 and a method according to claim 18. The dependent claims relate to advantageous exemplary embodiments of the machine tool according to the invention and the method according to the invention.

The machine tool for machining a workpiece according to the invention comprises: a machine table for clamping the workpiece, a work spindle for receiving a tool for machining the workpiece, a work space substantially defined by the machine table and at least one first cover, and a tool changer arranged outside the work space and configured to change the tool received in the work spindle, wherein the machine tool is further configured such that the first cover is moved during a tool change, thereby expanding the work space of the machine tool by a tool changing area and exposing an access surface through which the tool changer can be moved into the tool changing area, and the work spindle is positioned in the tool changing area such that the tool changer is able to change the tool received by the work spindle within the tool changing area.

The machine tool according to the invention made it possible for a tool change to be performed outside of the work space while still ensuring that the machine tool has a structure that is as compact as possible. It is now possible to avoid the risk of the tool changer colliding with the workpiece or optional clamping means of the workpiece since there is no interfering contour on the part of the work spindle or the tool changer with the work space.

Furthermore, the machine tool according to the invention is configured such that the expansion of the work space by the tool changing area and the exposure of the access or the access surface for the tool changer through which the tool changer can be moved into the tool changing area takes place simultaneously since only the movement of the first cover is necessary.

By using a separate drive for the first cover, the two steps may therefore take place in parallel, resulting in a reduction in the tool changing time and the time from machining to machining.

Furthermore, the machine tool according to the invention allowed for a projection of the Z-axis or the length of the carrier, on the end section of which the work spindle is provided, to be reduced. This allowed for the machine dynamics to be increased and the precision of the machine tool to be optimized.

Moreover, the machine tool according to the invention allows for material chips and cooling lubricants that are deposited on the carrier during machining to be removed from the carrier by providing scrapers, so that the material chips are neither deposited on the carrier nor are able to reach the feed mechanisms of the work spindle (along the x, y and z axes). This also increases the reliability of the machine tool.

Furthermore, due to the tool magazine carried laterally next to the carrier, the structure of the machine tool could be rendered even more compact, so that the tool changing time could be reduced considerably.

Moreover, due to the more compact structure, the machine tool according to the invention has a higher rigidity at the same or lower casting mass, resulting in an additional positive effect on the thermal stability and in a higher geometrical accuracy. The machine dynamics could also be positively affected thereby.

An advantageous development of the machine tool is that the work space of the machine tool is substantially defined by the machine table, the first cover, and a second cover.

Here, the work space available for machining the workpiece could be enlarged by means of the principle with the movable first cover and the second cover as a partition between the work space and the travelling column of the machine tool.

Furthermore, it is an advantageous development of the machine tool that the exposed access surface extends substantially perpendicular to the second cover.

In addition, the machine tool according to the invention may advantageously be developed further in that the exposed access surface extends substantially perpendicular to the machine table.

In both cases, it is possible for the access surface for the tool changer to be exposed simultaneously with the movement of the first cover. As already explained above, this saves a considerable amount of tool changing time, so that workpieces can be machined more quickly with different tools.

Moreover, it is possible to further develop the machine tool according to the invention in a particularly advantageous manner in that the access surface is separated from the work space of the machine tool during machining of the workpiece by the first cover and the second cover, wherein, while the workpiece is being machined, the first cover and the second cover are arranged substantially coplanar with one another and separate the tool changing area from the work space.

Separating the tool changing area and the feed mechanics of the tool spindle from the work space while the workpiece is being machined has a positive effect on the reliability of the machine tool since no material chips or cooling lubricants can enter into the tool changing area or the feed mechanics and possibly contaminate and/or damage them.

A particularly advantageous development of the machine tool according to the invention is that at least the first cover is moved out of the work space in one direction in order to expand the work space of the machine tool by the tool changing area.

This makes it possible to expand the work space directly by the tool changing area so that the tool change does not have to take place within the work space of the machine tool, possibly resulting in a collision of the tool changer with the workpiece and/or the clamping means of the workpiece.

Moreover, the machine tool according to the invention may be advantageously developed in that at least the first cover is moved by a separate drive independently of the drive for moving the work spindle.

It is particularly advantageous when the first cover can be moved independently of the movement of the work spindle since this is the only way, for example, for the scrapers to reliably remove the material chips accumulated on the carrier and the cooling lubricant.

Moreover, the machine tool according to the invention may be advantageously further developed in that the work spindle is arranged on an end section of a movable carrier which moves in the longitudinal direction through an opening in the first cover.

The opening in the first cover allows for the carrier and thus the work spindle to be moved independently of the first cover.

According to the invention, the machine tool may be further developed in that the clamping surface of the machine table spans an x-y plane and the first cover substantially spans an x-z plane.

This makes it clear that the clamping surface of the machine table and the first cover (and also the second cover) are arranged substantially perpendicular to one another.

An advantageous further development of the machine tool according to the invention is that the work spindle is positioned in the tool changing area by moving the carrier along its longitudinal direction in order to position the work spindle in the direction of the y-axis.

Moreover, the machine tool according to the invention may be further developed particularly advantageously in that the tool changer is arranged on a tool magazine arranged laterally spaced apart in the x direction next to the carrier.

By providing the tool magazine with the tool changer in the vicinity of the carrier and thus in the vicinity of the work spindle, required tools can be supplied to the work spindle within a short time and thus the processing time of a workpiece with a plurality of tools can be significantly reduced.

The machine tool according to the invention may be further developed particularly advantageously in that the tool magazine is separated from the work space of the machine tool by the first cover and the second cover while the workpiece is being machined, the first cover and the second cover being arranged substantially coplanar with each other while the workpiece is being machined.

Separating the tool magazine from the work space while the workpiece is being machined has a positive effect on the reliability of the machine tool since no material chips or cooling lubricants can enter into the tool magazine, the linear axis or the tool changer and possibly contaminate and/or damage them.

An advantageous further development of the machine tool according to the invention is that the tool magazine and the tool changer are moved in parallel to the carrier while the carrier is being moved in the x direction.

A particularly advantageous further development is that the tool magazine may be carried along in the x direction with the movement of the carrier (and the work spindle). As a result, a tool change can be carried out at any position on the work spindle along the x-axis, thus avoiding additional feed movements of the work spindle and, in turn, reducing the tool changing time and the processing time of the workpiece.

The machine tool according to the invention may advantageously be further developed in that the tool magazine includes a linear axis moving the tool changer through the access surface into the tool changing area by which the work space of the machine tool has been expanded.

In order to move the tool changer into the tool changing area, advantageously, the linear axis may be provided, so that the tool changer can move from its position separate from the work space behind the first and the second cover into the tool changing area in order to carry out the tool change on the work spindle there.

Moreover, the machine tool according to the invention may advantageously be further developed in that the tool changer is configured as a double gripper.

However, any other configuration of a tool changer may also be provided in the machine tool according to the invention.

Furthermore, the machine tool according to the invention may advantageously be further developed in that the opening in the first cover, through which the carrier extends, includes at least one scraper that removes material chips and/or cooling lubricants present on the carrier off the carrier when the work spindle is moved in the direction of the first cover.

The at least one scraper advantageously allows for the carrier to be cleared/cleaned of adhering material chips and cooling lubricants.

Furthermore, it is possible to advantageously further develop the machine tool according to the invention in that the machine tool further includes a drainage plate below the first cover, said drainage plate catching cooling lubricants and material chips flowing off from the first cover during the tool change and diverting them to a collecting area.

After the scraper has scraped the material chips and the cooling lubricant from the carrier, they flow down the first cover and are advantageously to be supplied to a treatment in a directed manner. This is made possible by the drainage plate since it feeds the dripping cooling lubricant and the material chips, for example, to a collecting area below the machine table from where the cooling lubricant may be passed on and may be reprocessed inside or outside the machine tool.

The method according to the invention for machining the workpiece on the machine tool according to an NC program, wherein the machine tool comprises a machine table for clamping the workpiece, a work spindle for receiving a tool for machining the workpiece, a work space substantially defined by the machine table and at least one first cover, and a tool changer arranged outside the work space and configured to change the tool received in the work spindle, said method comprising the steps of: clamping the workpiece on the machine table of the machine tool, receiving the tool for machining the workpiece in the work spindle, machining the workpiece according to the NC program, wherein the following steps are carried out during a tool change: moving the first cover, as a result of which the work space of the machine tool is expanded by a tool changing area and an access surface through which the tool changer can be moved into the tool changing area is exposed, moving the tool changer through the exposed access surface into the tool changing area, and positioning the work spindle in the tool changing area such that the tool changer is able to change the tool received by the work spindle within the tool changing area.

The method according to the invention now allows for a workpiece to be processed faster, in particular when different tools have to be used for that purpose and therefore a tool change has to be carried out frequently.

Moreover, the method has the advantages of the described machine tool according to the invention, in particular the advantages that the tool change can take place outside the work space of the machine tool, making it possible to significantly reduce the risk of collision between the tool changer and the workpiece or the clamping means of the workpiece as a result.

The method according to the invention may advantageously be further developed in that the tool changer is moved through the exposed access surface into the tool changing area independently of the step of positioning the work spindle in the tool changing area.

Moreover, the method according to the invention may advantageously be further developed in that the work spindle is moved in the direction of the first cover independently of the movement of the first cover for expanding the work space by the tool changing area.

It is completely irrelevant whether, after the work space of the machine tool has been expanded by the tool changing area, the work spindle is first positioned in the tool changing area or whether the tool changer is first moved into the tool changing area by the linear axis, or whether both take place at the same time. Various sequences of method steps are possible and are not completely covered by the aforementioned examples.

The machine tool according to the invention made it possible, on the one hand, to significantly reduce the risk of the tool changer colliding with other elements in the work space since the tool change takes place outside the work space. Furthermore, the machine tool according to the invention made it possible to obtain a more compact structure of the machine tool, resulting in an increase in machine dynamics and rigidity and thus in an increase in the precision during machining. The thermal stability of the machine structure could also be improved as a result.

Further aspects and advantages thereof as well as advantages and more specific implementation options for the aspects and features described above are described in the following descriptions and explanations relating to the attached figures, which are in no way to be interpreted as restrictive.

DETAILED DESCRIPTION OF THE FIGURES AND PREFERRED EMBODIMENTS OF THE PRESENT INVENTION

In the following, examples and exemplary embodiments of the present invention are described in detail with reference to the accompanying figures. Identical or similar elements in the figures may be designated with the same reference symbols, but sometimes also with different reference symbols.

It should be emphasized that the present invention, however, is in no way limited or restricted to the exemplary embodiments described below and implementation features thereof, but rather further comprises modifications of the exemplary embodiments, in particular those that are included within the scope of protection of the independent claims by modifications of the features of the described examples or by combinations of one or more of the features of the examples described.

Figure 1:
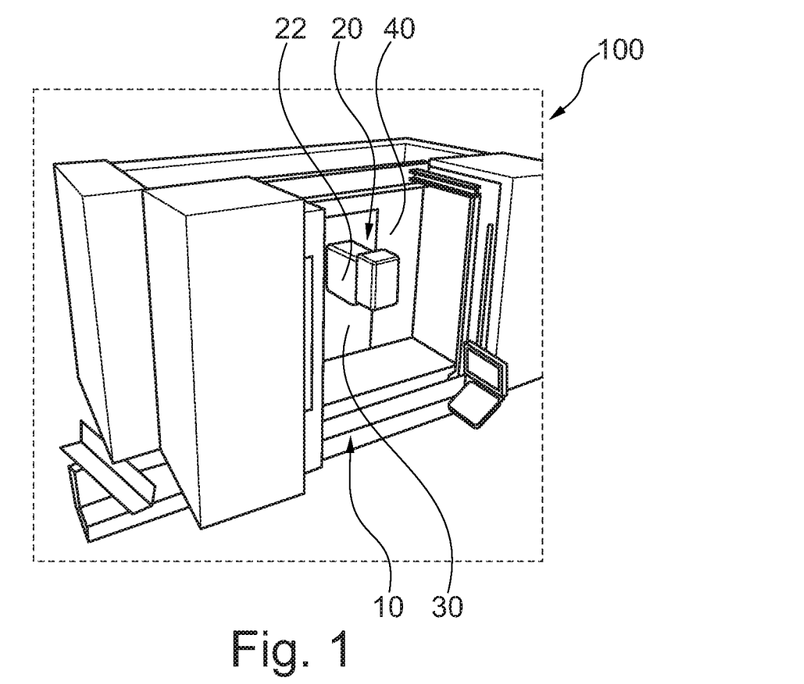
FIG. 1 schematically shows the machine tool according to the invention in a closed state in which no tool change can take place.

FIG. 1 schematically shows the machine tool 100 according to the invention in a closed state in which no tool change can take place.

Here, in addition to the work spindle 20 arranged on the carrier 22 and the machine table 10, the machine tool 100 includes the first cover 30 and the second cover 40.

Specifically, FIG. 1 shows the state of the machine tool 100, in which the first cover 30 is arranged substantially coplanar with respect to the second cover 40. This is the case, for example, whenever a workpiece clamped on the machine table 10 is to be machined by the work spindle 20 by means of a tool.

For this purpose, a wide variety of tools may be received in the work spindle 20, in particular tools for machining the workpiece, which, for example, include a standardized receptacle such as a hollow shank taper or a steep taper. However, other tool receptacles specific to the manufacturers of the tools may also be received by the work spindle 20. A correspondingly equipped work spindle 20 is, of course, a prerequisite for this.

In order to clamp the workpiece on the machine table 10, a wide variety of clamping means such as clamping claws, mechanical or hydraulic workpiece clamps, a wide variety of jaw chucks, etc. may be used.

The examples mentioned are not to be interpreted as restrictive and may include further options for receiving tools and/or for clamping the workpiece.

Figure 2:
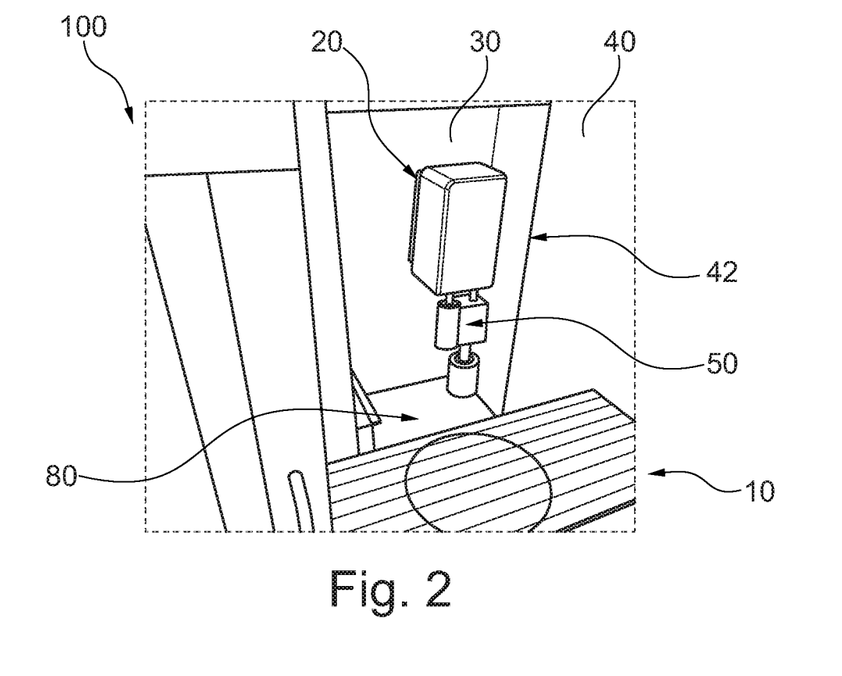
FIG. 2 schematically shows a detailed view of the machine tool according to the invention in the state of the tool change with the tool changer moved into the tool changing area.

FIG. 2 schematically shows a detailed view of the machine tool 100 according to the invention in the state of the tool change with the tool changer 50 moved into the tool changing area 80.

In detail, FIG. 2 shows that the first cover 30 is set back with respect to the second cover 40. This setting back is carried out by a drive 35 (not shown here, see FIG. 5) on the first cover 30 when a tool change is imminent.

Figure 5:
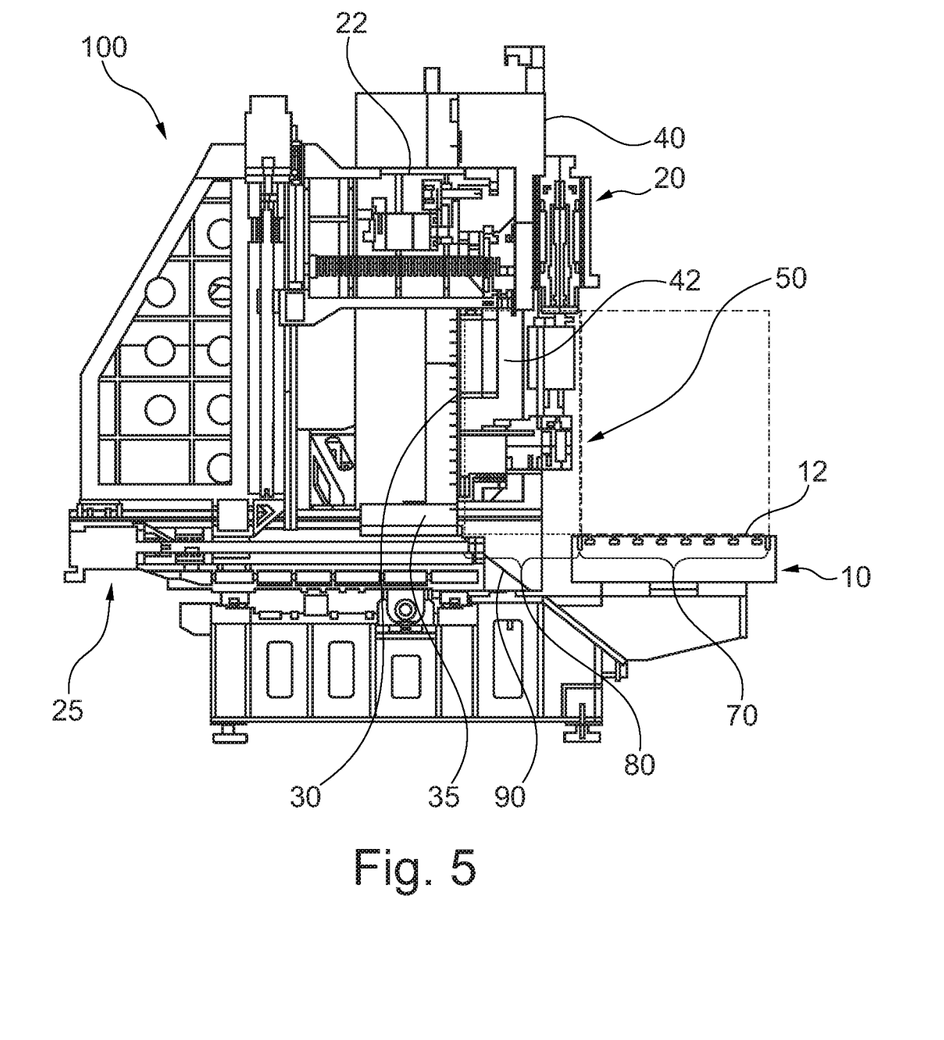
FIG. 5 schematically shows a sectional view of the machine tool according to the invention with the division of the work space and the tool changing area.

Specifically, the first cover 30 is set back by the drive 35 with respect to the second cover 40 in order to expand the work space 70 (not shown here, see FIG. 5) of the machine tool 100 defined by the first cover 30 and/or second cover 40 and the machine table 10 by a tool changing area 80 (not shown here, see FIG. 5).

This makes it possible, to a particularly advantageous extent, that the imminent tool change does not have to take place in the area of the work space 70, which would harbor the risk of a collision with the workpiece and/or other elements (e.g. machine table, mounted clamping devices for the workpiece, etc.) when the tool is changed or when the tool changer 50 moves into the work space 70.

In order to prevent this and to make the tool change process safer, it is therefore advisable to carry out the tool change outside the work space 70.

Moreover, FIG. 2 shows a particularly advantageous embodiment of the machine tool 100 according to the invention, wherein an access surface 42, through which the tool changer 50 (configured as a double gripper here) can be moved into the tool changing area 80, is exposed simultaneously by setting back the first cover 30 with respect to the second cover 40.

This is so advantageous because the movement of the first cover 30 simultaneously exposes the access surface 42 and additional drives and/or guides for exposing the access surface can be omitted as a result. Furthermore, the overall tool changing time and the time from machining to machining are kept low, allowing for the machine tool to operate more effectively.

This becomes possible because the access surface 42 extends substantially perpendicular to the first cover 30 (and thus also substantially perpendicular to the second cover 40). When the first cover 30 is moved in a direction extending out of the work space, a surface arranged substantially perpendicular to the first cover 30 and the second cover 40 is created between the first cover 30 and the second cover 40. If this surface is now used to move the tool changer 50 into the created tool changing area 80, then, with just one movement of the first cover 30, both the tool changing area 80 can be created and, simultaneously, an access in the surface (access surface 42) for the tool changer 50 can be exposed.

Moreover, such a configuration of the first cover 30 and the second cover 40 offers the advantage of keeping the structure of the machine tool 100 in the area of the devices required for the tool change compact.

Furthermore, in this particularly advantageous embodiment of the machine tool 100 according to the invention, the tool changer 50 and a tool magazine 60 (not shown here, see FIG. 8) are separated from the work space 70 by the first cover 30 and/or by the second cover 40.

This is advantageous because cooling lubricants supplied during the machining of workpieces and material chips removed from the workpiece are spread in the work space 70 so that they, of course, also contaminate the tool changer 50 and/or the tool magazine 60 and may even damage them as a result. Protection of these devices from the cooling lubricants and from the material chips is therefore appropriate and increases the reliability of the machine tool 100 according to the invention.

Figure 3:
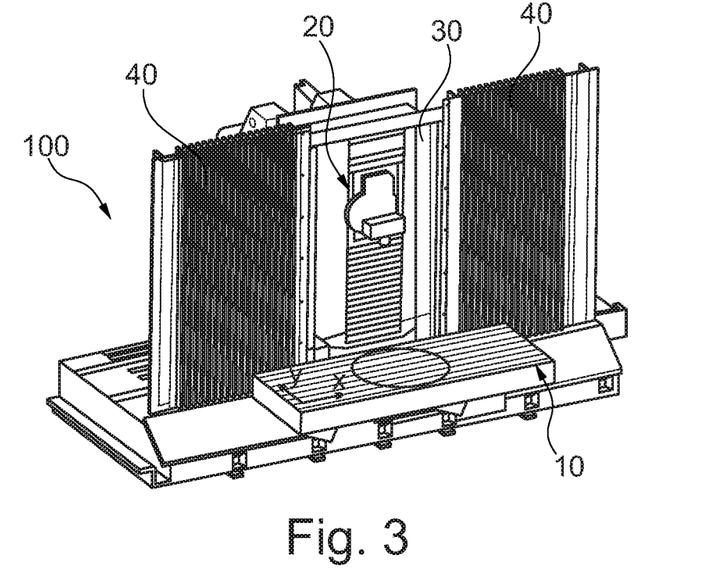
FIG. 3 schematically shows the machine tool according to the invention in the closed state with an x-y plane spanned by the machine table.

FIG. 3 schematically shows the machine tool 100 according to the invention in the closed state with an x-y plane spanned by the machine table 10.

Here, the machine tool 100 according to the invention is reduced to the elements of the first cover 30 and the second cover 40 as well as the machine table 10 and the work spindle 20 in order highlight once again the closed state of the machine tool 100 when the first cover 30 and the second cover 40 are arranged substantially coplanar with one another to.

Here, the second cover 40 may consist of several individual segments that can be nested so that the first cover 30 cannot only be moved in the y-direction (corresponding to a direction extending out of the work space 70), but also along the x-axis. Furthermore, the second cover 40 may also be constructed from segments that can be folded/nested together like a bellows.

The first cover 30 may also be constructed from several different sections. For example, below and/or above the carrier 22 of the work spindle 20, similar to the second cover 40, a plurality of individual segments that can be nested may be provided in the first cover 30, allowing for the carrier 22 and thus the work spindle 20 to move in the z-direction and thus allowing for feeding the work spindle along the three axes (x-, y- and z-axis).

Figure 4:
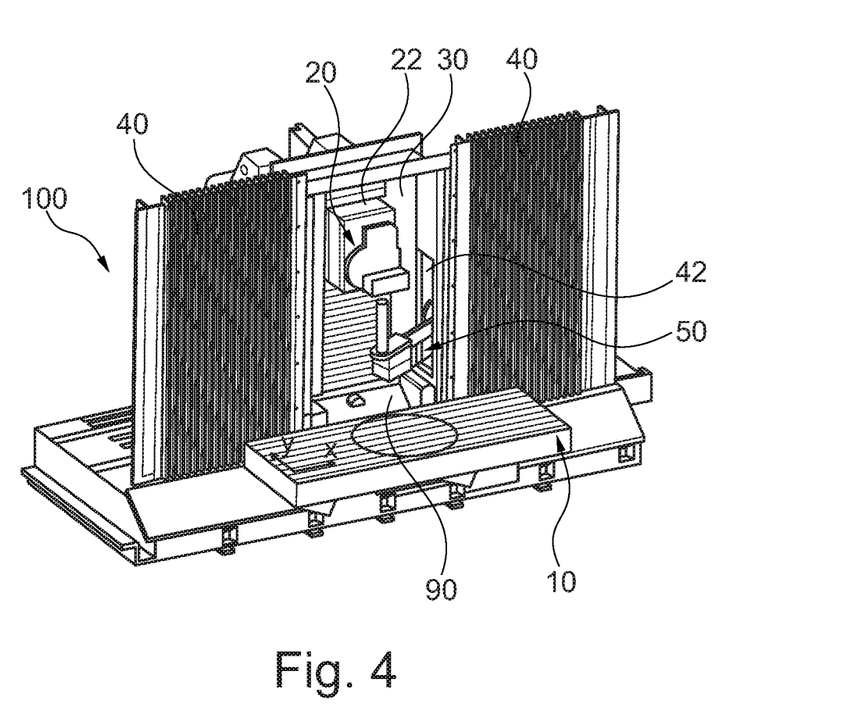
FIG. 4 schematically shows the machine tool according to the invention in the state of the tool change with the x-y plane spanned by the machine table.

FIG. 4 schematically shows the machine tool 100 according to the invention in the state of the tool change with the x-y plane spanned by the machine table 10.

FIG. 4 shows once again where the access surface 42 for the tool changer 50 is arranged in the exemplary embodiment described in FIG. 2. As already shown and also described in FIG. 2, a single movement of the first cover 30 in a direction out of the work space or away from the work space creates the tool changing area 80 and at the same time exposes the access surface 42 so that the tool changer 50 (embodied as a double gripper here) can be moved into the tool changing area 80. Advantageously, a tool change outside of the work space 70 is thus possible.

FIG. 4 also shows, below the first cover 30, the drainage plate 90 which catches cooling lubricant dripping from the first cover 30 and/or material chips removed from the workpiece during the tool change and directs these to a collecting area which may be located below the machine table 10, for example. From this collecting area, material chips and cooling lubricant may be provided to reprocessing inside or outside the machine tool 100.

The above examples are not to be interpreted as restrictive. For example, the tool changer 50 may be configured as any type and is not limited to the exemplary embodiment of a double gripper.

FIG. 5 schematically shows a sectional view of the machine tool 100 according to the invention with the division of the work space 70 and the tool changing area 80.

FIG. 5 shows the position of the tool changing area 80 (indicated by dotted lines here), by which the work space 70 (indicated by dashed lines here) is expanded when moving the first cover 30, with respect to the work space 70. The work space 70 is substantially delimited and defined by the machine table 10 (or the clamping surface 12 thereof) and by the first cover 30 and/or the second cover 40 when the first cover 30 is arranged substantially coplanar with the second cover 40.

As shown in FIG. 5, the first cover 30 has now been moved in such a way that the tool changing area 80 was created in the immediate vicinity or directly adjacent to the work space 70. In the tool changing area 80, the tool changer 50 can now be moved into the tool changing area 80 through the access surface 42 that was exposed by the movement of the first cover 30. If the work spindle 20 is now also positioned in the tool changing area 80, the tool received by the work spindle 20 can be changed by the tool changer 50.

It should be noted here that it is irrelevant whether, after the tool changing area 80 has been created, the tool changer 50 is first moved into the tool changing area 80 or the work spindle 20 is first positioned in the tool changing area 80.

The sectional view of the machine tool 100 according to the invention further shows that the carrier 22 and thus the work spindle 20 can be moved in the y-direction by a corresponding drive 25 independently of the movement of the first cover 30 effected by a separate drive 35.

Furthermore, FIG. 5 shows that the drainage plate 90 catches cooling lubricant and material chips that can drip/fall off the first cover 30 during the tool change and directs them to a collecting area (e.g., below the machine table 10), so that the material chips and the used cooling lubricant can no longer affect the machining process of the workpiece.

Figure 6:
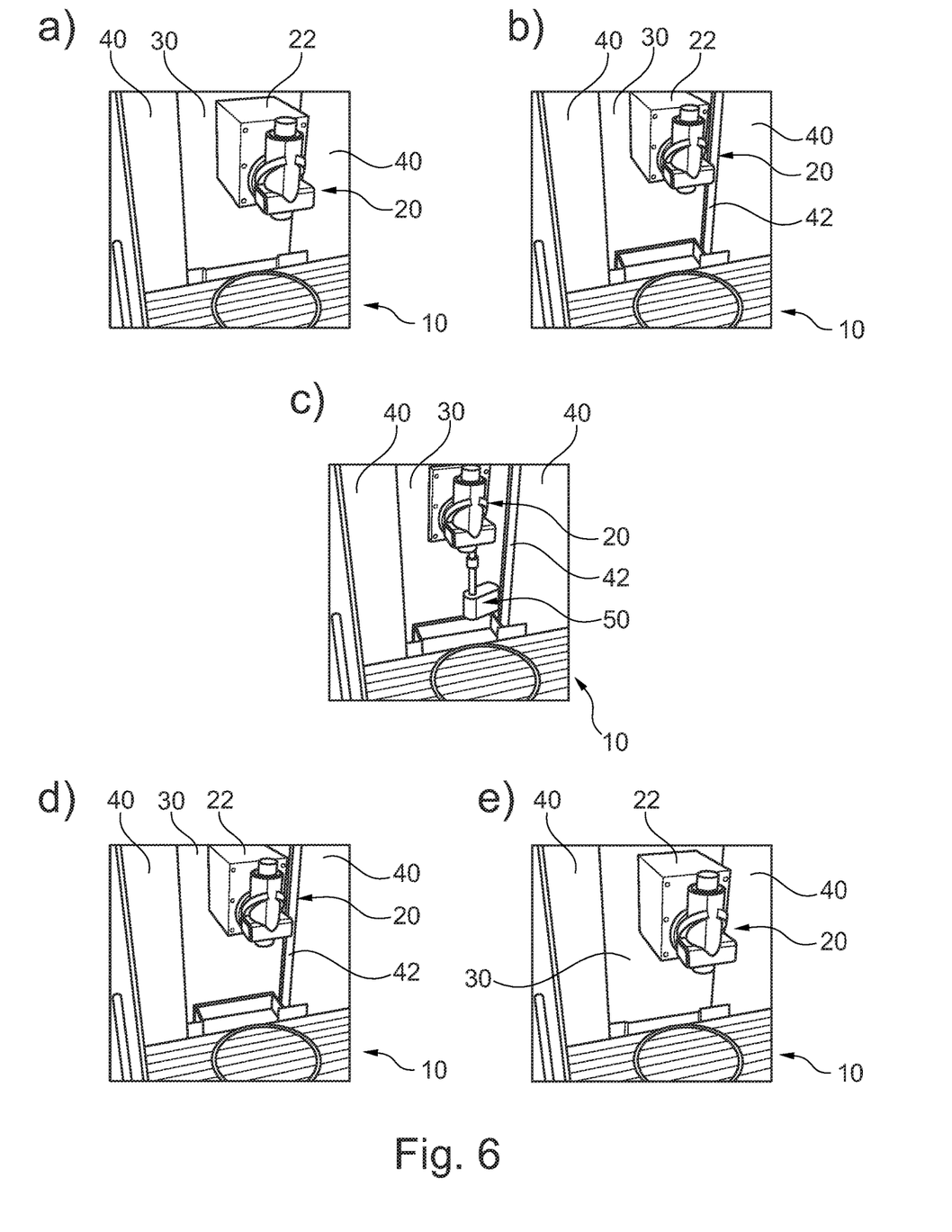
FIG. 6 shows schematically the sequence of a tool change in the machine tool according to the invention.

FIG. 6 schematically shows the sequence of a tool change in the machine tool 100 according to the invention.

At the beginning, in diagram a), the machine tool 100 is shown in the closed state, in which the first cover 30 and the second cover 40 are arranged substantially coplanar with one another.

Diagram b) now shows that the first cover 30 was moved such that the tool changing area 80 (area between the first cover 30 and the machine table 10) was created in the immediate vicinity or adjacent to the work space 70 and the access surface 42 to the tool changing area was exposed.

Diagram c) now shows how the work spindle 20 is positioned in the tool changing area 80 and the tool changer 50 was moved through the access surface 42 into the tool changing area 80, so that a tool received by the work spindle 20 can be changed/replaced by the tool changer 50.

Once the tool has been changed/replaced (see diagram d)), the tool changer 50 withdraws through the access surface 42 from the tool changing area 80 and thereby allows for the first cover 30 to be moved to close the access surface 42 and the tool changing area 80.

Diagram e) again shows the machine tool 100 according to the invention in the closed state, in which the first cover 30 and the second cover 40 are again arranged substantially coplanar with one another.

Figure 7:
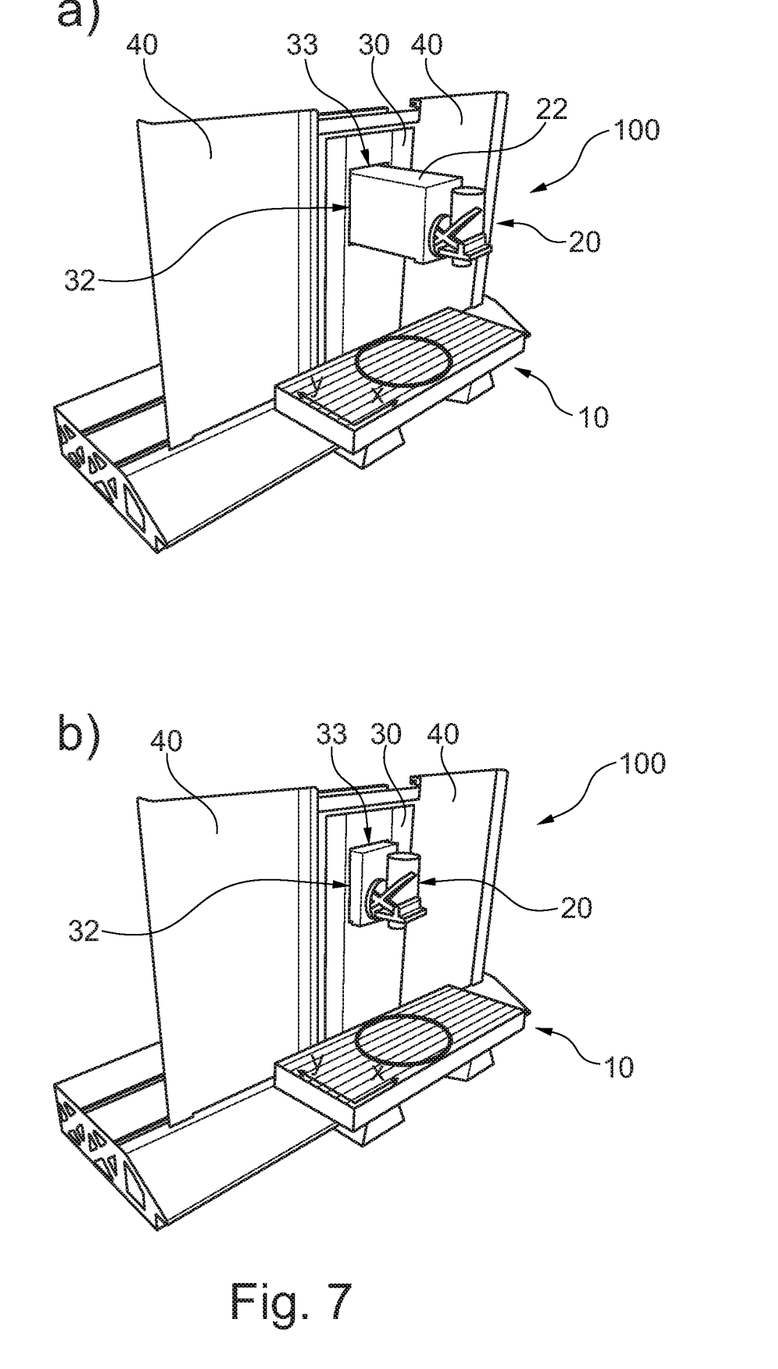
FIG. 7 schematically shows the work spindle moving independently of the first cover, the first cover also including scrapers for scraping off cooling lubricants and material chips.

FIG. 7 schematically shows the movement of the work spindle 20 independently of the first cover 30, wherein the first cover 30 also includes scrapers 33 for scraping off cooling lubricants and material chips.

FIG. 7 again shows the machine tool 100 according to the invention which was essentially reduced to the elements of the first cover 30 and the second cover 40 as well as the machine table 10 and the work spindle 20.

However, the first cover 30 also has an opening 32 through which the carrier 22 extends, at the end portion of which the work spindle 20 is arranged. This allows for the carrier 22 to move/displace the work spindle 20 in the y-direction independently of the position or of a movement of the first cover 30.

Moreover, it is advantageous when the first cover 30 in the area of the opening 32 (or the opening 32 itself) includes at least one scraper 33 scraping cooling lubricants and material chips that accumulate during the machining of the workpiece and may be deposited on the carrier 22, off the carrier 22.

This may be particularly advantageous when the work spindle 20 is positioned very close to the first cover 30 before a tool change or after a long period of machining a workpiece, so that the greatest possible number of material chips or the greatest possible amount of cooling lubricant can be scraped off the carrier. The cooling lubricant with material chips stripped off the carrier 22 can thus be provided to reprocessing and does not accumulate on the carrier 22 over a longer period of time.

Diagram a) now shows the position of the carrier 22 with the work spindle 20 when it is substantially extended the furthest (maximum feed path of the work spindle 20 in the y-direction). And diagram b) shows the work spindle 20 when it has been moved or positioned substantially up to the first cover 30, as a result of which the cooling lubricant and the material chips have been scraped off the carrier 22.

Figure 8:
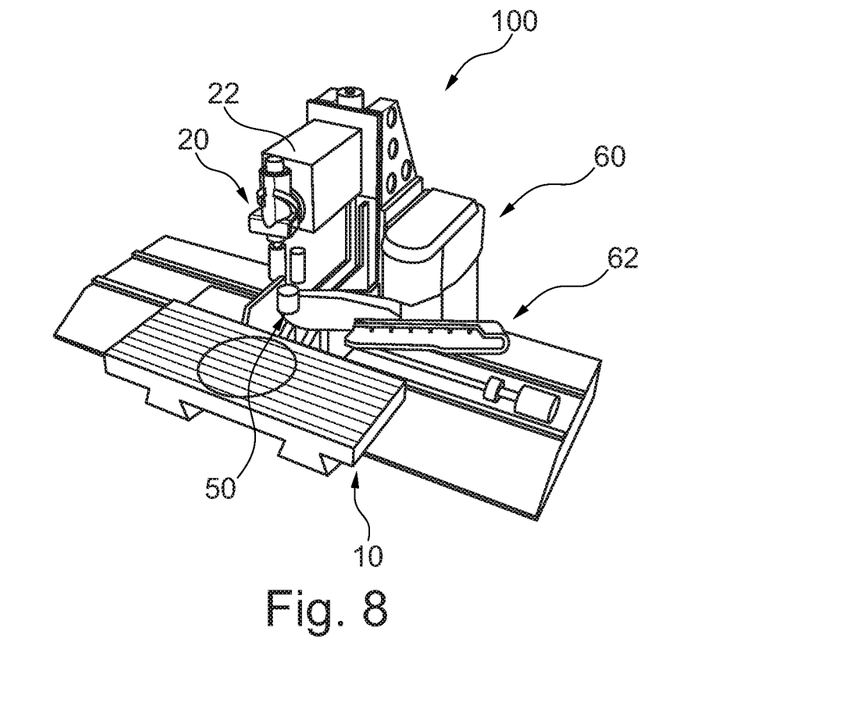
FIG. 8 schematically shows the machine tool according to the invention with a laterally attached tool magazine and linear axis for the tool changer FIG. 9 schematically shows a machine tool known in the prior art, wherein the tool change takes place in the area of the work space

FIG. 8 schematically shows the machine tool 100 according to the invention with a laterally attached tool magazine 60 and linear axis 62 for the tool changer 50.

In order to make the tool magazine 60 and the linear axis more recognizable, the machine tool 100 according to the invention has been further reduced by the elements of the first cover 30 and the second cover 40 in this figure.

As shown, the tool magazine 60 is arranged laterally in the x-direction next to the carrier 22 on the movable column and additionally includes the linear axis/drive 62 by means of which the tool changer 50 can be moved through the access surface 42 (not shown here) into the tool changing area 80 created in order to carry out the tool change on the work spindle 20.

A clear advantage of this configuration is that the tool magazine 60 moves in parallel to a movement of the work spindle 20 or of the carrier 22 in the x-direction. This means that the tool change can take place substantially at any desired position of the work spindle 20 along the x-axis, without the need for an additional feed of the work spindle 20 to a specific "tool changing position" along the x-axis.

Such a configuration also makes it possible for the slide for the feed of the work spindle 20 to be structured symmetrically in the y-direction and to be structurally closed. This also makes it possible to arrange drives for the slide centrally and, when using the work spindle 20 on the carrier 22 as a swivel head, to allow for a small distance between the B-axis, about which the swivel head can rotate, and the spindle nose receiving the tool, resulting in advantages in terms of machine dynamics and rigidity.

Furthermore, the tool magazine 60 may be configured as a chain magazine or a wheel magazine, but also as a shelf magazine. Furthermore, an additional feed unit may also be provided for removing the tool from the corresponding magazine and feeding it to the tool changer 50 before the latter inserts the tool into the work spindle 20. The examples mentioned here should again be interpreted as non-restrictive and may include further exemplary embodiments.

Figure 9:
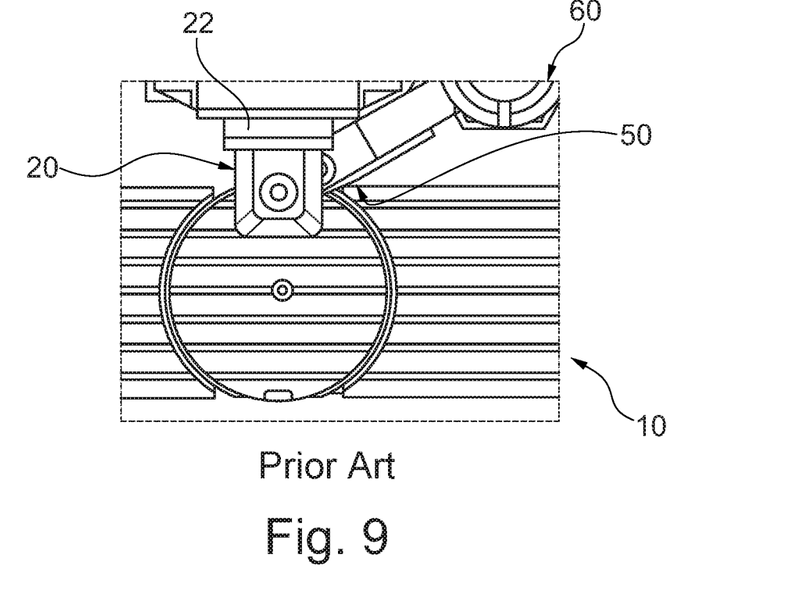

FIG. 9 schematically shows a machine tool known in the prior art, wherein the tool change takes place in the area of the work space.

Here, as in the prior art, it is apparent that the tool changer 50 usually or very frequently moves up to the work spindle 20 in order to change the tool. For this purpose, however, the work space of the machine tool is restricted (the work spindle 20 is above the machine table 10 while the tool is changed/replaced by the tool changer 50). However, this harbors the risk that the tool changer 50 may collide with the workpiece and/or, for example, the clamping means of the workpiece.

As a result, it is advantageous to develop a machine tool of the type travelling column according to the machine tool according to the invention further in order to avoid the corresponding disadvantages of the known travelling column machines and to provide a faster, more reliable, and more precise machine tool.

Figure 10:
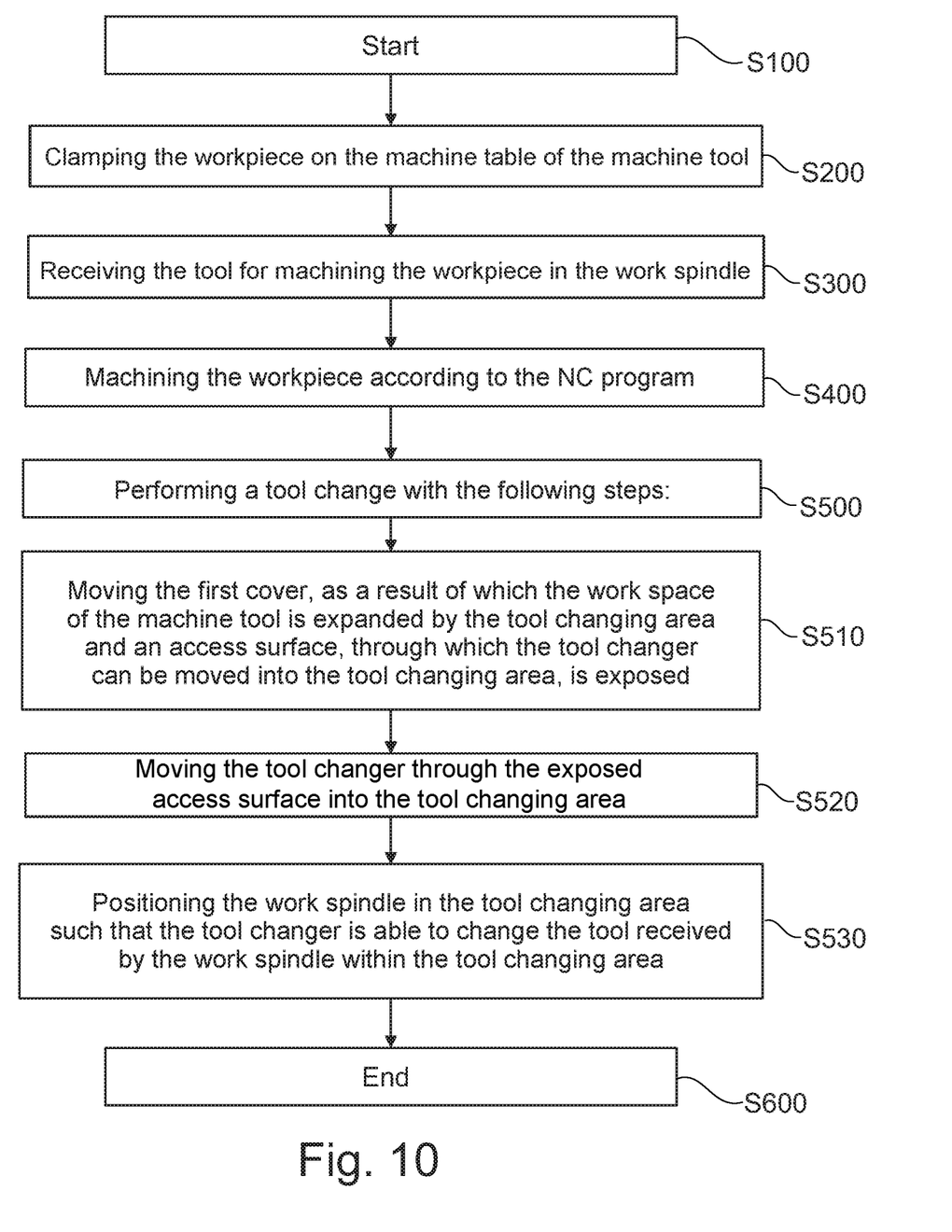
FIG. 10 shows a flow chart of an exemplary embodiment of the method according to the invention for machining the workpiece.

FIG. 10 shows a flow chart of an exemplary embodiment of the method according to the invention for machining the workpiece.

First, in step S200, the workpiece is clamped on the machine table 10 of the machine tool 100 according to the invention. This can be done with a wide variety of clamping means such as clamping claws, mechanical or hydraulic workpiece clamps, a wide variety of jaw chucks, etc.

In the next step S300, the tool with which the workpiece is to be machined is received in the work spindle 20. For this purpose, a wide variety of tools can be received in the work spindle 20, in particular tools for machining the workpiece which, for example, have a standardized receptacle such as a hollow shank taper or a steep taper. However, other tool receptacles specific to the manufacturers of the tools may also be received by the work spindle 20. However, a correspondingly equipped work spindle 20 is a prerequisite for this purpose.

The machining, in particular chipping machining, of the workpiece can now be performed by the tool received by the work spindle 20 (step S400). The tool is guided by the work spindle 20 and by the feed movements of the work spindle along the x-, y- and z-axes along the workpiece or into the workpiece in accordance with the NC program.

However, additional feed movements can also take place around a B-axis (if the work spindle 20 is configured as a swivel head, for example) or around a C-axis (e.g., by means of a swiveling machine table 10, etc.).

When the machining of the workpiece with the tool accommodated in the work spindle 20 is complete or is currently interrupted, a tool change can take place in the subsequent step S500.

For this purpose, first, the first cover 30 is moved in step S510, as a result of which the work space 70 of the machine tool 100 is expanded by the tool changing area 80. For this purpose, the first cover 30 is moved in a direction out of the work space 70.

In addition, the movement of the first cover 30 exposes the access surface 42 through which the tool changer 50 can be moved into the tool changing area 80.

In the following step S520, the tool changer 50 is accordingly moved by a linear axis 62 of the tool magazine 60 through the exposed access surface 42 into the tool changing area 80.

Subsequently, the work spindle 20 is positioned in the tool changing area 80, so that the tool changer 50 can change/replace the tool received by the work spindle 20 within the tool changing area 80 (step S530).

The machining of the workpiece may then be continued.

Above, examples or exemplary embodiments of the present invention and advantages thereof have been described in detail with reference to the accompanying figures.

It should be emphasized again, however, that the present invention is in no way limited or restricted to the exemplary embodiments described above and implementation features thereof, but rather further comprises modifications of the exemplary embodiments, in particular those that are included within the scope of protection of the independent claims by modifications of the features of the described examples or by combinations of one or more of the features of the examples described.

LIST OF REFERENCE SYMBOLS

10 Machine table
12 Clamping surface of the machine table
20 Work spindle
22 Carrier
25 Drive of the carrier
30 First cover
32 Opening in the first cover
33 Scraper
35 Drive of the first cover
40 Second cover
42 Access surface
50 Tool changer
60 Tool magazine
62 Linear axis for tool changer
70 Work space of the machine tool
80 Tool changing area
90 Plate for draining coolant and material chips
100 Machine tool

The invention claimed is:

1. A machine tool (100) for machining a workpiece, the machine tool comprising:
a machine table (10) for clamping said workpiece;
a work spindle (20) for receiving a tool for machining said workpiece;
a work space in which said workpiece is machined by said tool, which work space is substantially defined by said machine table (10) and by at least one first cover (30) when said at least one first cover is at a first position; and
a tool changer (50) arranged outside said work space and configured to change the tool received in said work spindle (20);
wherein said machine tool (100) is further configured such that, during a tool change;
said at least one first cover (30) is moved from the first position, as a result of which movement said work space of said machine tool (100) becomes contiguous with a tool changing area (80), and also as a result of which movement an access surface (42), through which said tool changer (50) can be moved into said tool changing area (80), is exposed; and
said work spindle (20) is positioned in said tool changing area (80) such that said tool changer (50) is able to change the tool received by said work spindle (20) within said tool changing area (80).

2. The machine tool (100) according to claim 1, characterized in that said work space of said machine tool (100) is additionally substantially defined by a second cover (40).

3. The machine tool (100) according to claim 2, characterized in that the exposed access surface (42) extends substantially perpendicular to said second cover (40).

4. The machine tool (100) according to claim 2, characterized in that the exposed access surface (42) extends substantially perpendicular to said machine table (10).

5. The machine tool (100) according to claim 2, characterized in that,
when said workpiece is being machined, said access surface (42) is separated from said work space of said machine tool (100) by said at least one first cover (30) and by said second cover (40), wherein said at least one first cover (30) and said second cover (40) are arranged substantially coplanar with one another when said workpiece is being machined and separate said tool changing area (80) from said work space.

6. The machine tool (100) according to claim 1, characterized in that
at least said at least one first cover (30) is moved in a direction out of said work space in order to have said work space of said machine tool become contiguous with said tool changing area (80).

7. The machine tool (100) according to claim 6, characterized in that
at least said at least one first cover (30) is moved by a separate drive (35) independently of a movement caused by a drive for moving said work spindle (20).

8. The machine tool (100) according to claim 1, characterized in that
said work spindle (20) is arranged on an end portion of a movable carrier (22), which movable carrier moves in a longitudinal direction of the movable carrier through an opening (32) in said at least one first cover (30).

9. The machine tool (100) according to claim 8, characterized in that
a clamping surface of said machine table (10) spans an x-y plane,
said at least one first cover (30) substantially spans an x-z plane, and
said work spindle (20) is positioned in said tool changing area (80) by moving said carrier (22) along said longitudinal direction in order to position said work spindle (20) in the direction of the y-axis.

10. The machine tool (100) according to claim 8, characterized in that
a clamping surface of said machine table (10) spans an x-y plane,
said at least one first cover (30) substantially spans an x-z plane, and
said tool changer (50) is arranged on a tool magazine (60) arranged laterally spaced apart in the x-direction next to said carrier (22).

11. The machine tool (100) according to claim 10, characterized in that
said tool magazine (60) is separated from said work space of said machine tool (100) by said at least one first cover (30) and by said second cover (40) when said workpiece is being machined, wherein said at least one first cover (30) and said second cover (40) are arranged substantially coplanar with one another when said workpiece is being machined.

12. The machine tool (100) according to claim 10, characterized in that, when said carrier (22) is being moved in the x-direction, said tool magazine (60) and said tool changer (50) are moved in parallel to said carrier (22).

13. The machine tool (100) according to claim 10, characterized in that
said tool magazine (60) includes a linear drive (62) moving said tool changer (50) through said access surface (42) into said tool changing area (80) with which said work space of said machine tool (100) is contiguous.

14. The machine tool (100) according to claim 8, characterized in that
the opening (32) in said at least one first cover (30), through which opening (32) said carrier (22) extends, includes at least one scraper (33) scraping material chips and/or cooling lubricants present on said carrier (22) off said carrier (22) when said work spindle (20) is moved in the longitudinal direction.

15. The machine tool (100) according to claim 14, characterized in that
said machine tool (100) further includes, below said at least one first cover (30), a drainage plate (90) which catches cooling lubricants and material chips flowing off from said at least one first cover (30) during the tool change and diverts them to a collecting area.

16. The machine tool according (100) to claim 1, characterized in that
a clamping surface of said machine table (10) spans an x-y plane, and
said at least one first cover (30) substantially spans an x-z plane.

17. The machine tool (100) according to claim 1, characterized in that
said tool changer (50) is configured as a double gripper.

18. A method for machining a workpiece on a machine tool (100) according to a numerically controlled (NC) program, said machine tool (100) comprising:
a machine table (10) for clamping said workpiece;
a work spindle (20) for receiving a tool for machining said workpiece;
a work space in which said workpiece is machined by said tool, which work space is substantially defined by said machine table (10) and by at least one first cover (30) when said at least one first cover is at a first position; and
a tool changer (50) arranged outside said work space and configured to change the tool received in said work spindle (20),
said method for machining said workpiece comprising the steps of:
clamping said workpiece on said machine table (10) of said machine tool;
receiving, in the work spindle (20), the tool for machining said workpiece; and
machining said workpiece according to said NC program; and
wherein the following steps are carried out during a tool change:
moving said at least one first cover (30) from the first position, as a result of which movement said work space of said machine tool (100) becomes contiguous with a tool changing area (80), and also as a result of which movement an access surface (42), through which said tool changer (50) can be moved into said tool changing area (80), is exposed;
moving said tool changer (50) through the exposed access surface (42) into said tool changing area (80), and
positioning said work spindle (20) in said tool changing area (80) such that said tool changer (50) is able to change the tool received by said work spindle (20) within said tool changing area (80).

19. The method according to claim 18, characterized in that
said tool changer (50) is moved through the exposed access surface (42) into said tool changing area (80) independently of the step of positioning said work spindle (20) in said tool changing area (80).

20. The method according to claim 18, characterized in that
said work spindle (20) is moved in a direction, independently of the movement of said at least one first cover (30) from the first position, which movement of said at least one first cover makes said work space contiguous with said tool changing area (80).

* * * * *